United States Patent
Tiwari et al.

(10) Patent No.: US 11,232,786 B2
(45) Date of Patent: Jan. 25, 2022

(54) SYSTEM AND METHOD TO IMPROVE PERFORMANCE OF A SPEECH RECOGNITION SYSTEM BY MEASURING AMOUNT OF CONFUSION BETWEEN WORDS

(71) Applicant: Disney Enterprises, Inc., Burbank, CA (US)

(72) Inventors: Sanchita Tiwari, Burbank, CA (US); Chang Shu, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 135 days.

(21) Appl. No.: 16/697,366

(22) Filed: Nov. 27, 2019

(65) Prior Publication Data

US 2021/0158804 A1    May 27, 2021

(51) Int. Cl.
*G10L 15/187* (2013.01)
*G10L 15/02* (2006.01)
*G10L 15/197* (2013.01)

(52) U.S. Cl.
CPC ............ *G10L 15/187* (2013.01); *G10L 15/02* (2013.01); *G10L 15/197* (2013.01); *G10L 2015/025* (2013.01)

(58) Field of Classification Search
None
See application file for complete search history.

(56) References Cited

U.S. PATENT DOCUMENTS 5,737,723 A * 4/1998 Riley .................. G10L 15/187
704/243
6,185,530 B1 * 2/2001 Ittycheriah ............ G10L 15/10
704/243

(Continued)

OTHER PUBLICATIONS

Tur, Gokhan, et al., Improving Spoken Language Understanding Using Word Confusion Networks, AT&T Labs-Research, Florham Park, NJ, pp. 1137-1140, 2002.

(Continued)

*Primary Examiner* — Douglas Godbold
(74) *Attorney, Agent, or Firm* — McCormick, Paulding & Huber PLLC

(57) ABSTRACT

Systems and methods to improve the performance of an automatic speech recognition (ASR) system using a confusion index indicative of the amount of confusion between words are described, where a confusion index (CI) or score is calculated by receiving a first word (Word1) and a second word (Word2), calculating an acoustic score (A12) indicative of the phonetic difference between Word1 and Word2, calculating a weighted language score (W(U1+U2), indicative of a weighted likelihood (or word frequency) of Word1 and Word2 occurring in the corpus, the confusion index CI incorporating both the acoustic score and the weighted language score, such that the CI for words that sound alike and have a high likelihood of occurring in the corpus will be higher than the CI for words that sound alike and do not have a high likelihood of occurring in the corpus. In some embodiments, the CI may be used to artificially boost uncommon words in a corpus to improve their visibility, to add context to uncommon words in a corpus to avoid conflict with common words, and to remove unimportant words from the lexicon to avoid conflicts with other corpus words.

18 Claims, 11 Drawing Sheets

(56) References Cited

U.S. PATENT DOCUMENTS

| | | | |
|---|---|---|---|
| 6,801,893 B1 | 10/2004 | Backfried et al. | |
| 7,571,098 B1 | 8/2009 | Gorin et al. | |
| 7,698,136 B1* | 4/2010 | Nguyen | G10L 15/08 |
| | | | 704/241 |
| 9,224,386 B1 | 12/2015 | Weber | |
| 2002/0116191 A1* | 8/2002 | Olsen | G10L 15/06 |
| | | | 704/251 |
| 2002/0138265 A1* | 9/2002 | Stevens | G10L 15/22 |
| | | | 704/251 |
| 2006/0116877 A1* | 6/2006 | Pickering | G10L 15/08 |
| | | | 704/231 |
| 2008/0221896 A1* | 9/2008 | Cai | G10L 15/19 |
| | | | 704/270.1 |
| 2008/0270110 A1* | 10/2008 | Yurick | G06F 16/685 |
| | | | 704/3 |
| 2008/0270138 A1* | 10/2008 | Knight | G06F 16/433 |
| | | | 704/260 |
| 2010/0082343 A1* | 4/2010 | Levit | G10L 15/32 |
| | | | 704/257 |
| 2010/0185446 A1* | 7/2010 | Homma | G01C 21/3608 |
| | | | 704/251 |
| 2011/0288867 A1* | 11/2011 | Chengalvarayan | G10L 15/1815 |
| | | | 704/251 |
| 2013/0289987 A1* | 10/2013 | Ganapathiraju | G10L 15/04 |
| | | | 704/236 |
| 2013/0289993 A1* | 10/2013 | Rao | G10L 15/22 |
| | | | 704/251 |
| 2014/0012575 A1* | 1/2014 | Ganong, III | G10L 15/1815 |
| | | | 704/239 |
| 2014/0012579 A1* | 1/2014 | Ganong, III | G10L 15/08 |
| | | | 704/257 |
| 2014/0019128 A1* | 1/2014 | Riskin | G06Q 10/06 |
| | | | 704/235 |
| 2015/0279358 A1* | 10/2015 | Kingsbury | G10L 15/083 |
| | | | 704/257 |
| 2018/0108354 A1* | 4/2018 | Negi | G10L 15/26 |
| 2018/0314689 A1* | 11/2018 | Wang | G10L 15/07 |
| 2020/0020340 A1* | 1/2020 | Sheikh | G06F 3/165 |
| 2020/0082808 A1* | 3/2020 | Li | G10L 15/10 |
| 2020/0403818 A1* | 12/2020 | Daredia | G10L 15/22 |

OTHER PUBLICATIONS

Juola, Patrick, Isolated-Word Confusion Metrics and the PGPFONE Alphabet, Department of Experimental Psychology, Oxford University, Oxford, UK, 1996.

* cited by examiner

Uncommon Word List Sample

| Uncommon Word List | Phonetically Similar Potential "Corpus" Words | | |
|---|---|---|---|
| AARON | ARON | ARRON | ERAN |
| ADRIAN | ADRIEN | ADRION | |
| ALES | ALICE | ELLIS | |
| ALI | ALY | ALLEY | ALLI |
| ARIEL | AERIAL | | |
| AXEL | AXLE | | |
| BALE | BAIL | BAILE | BALE |
| BASTEN | BOSTON | | |
| BODE | BOWED | | |
| COTE | COAT | | |
| DOS | DOSE | DOS | |
| FREI | FRY | FRYE | |
| GHANA | GANA | GONNA | |
| GRATE | GREAT | | |
| HED | HEAD | | |
| HOLY | WHOLLY | HOLLY | |
| KOP | COP | | |
| MESSI | MESSY | | |
| NICE | NEICE | | |
| PASTE | PACED | | |
| PHIL | FILL | | |
| PIQUE | PEAK | PEEK | |
| PUDIL | POODLE | | |
| ROSE | ROWS | ROWE'S | |
| RUBEN | REUBEN | | |
| RUUD | RUDE | ROOD | |
| SAN | SON | SUN | |
| SOMMER | SUMMER | | |
| WALES | WAILS | WHALES | |
| WILL | WE'LL | WILL | |
| ... | ... | ... | ... |

*FIG. 1B*

Confusion Index Parameter Table — 280

| Uncommon Word (Word1) | Corpus Word (Word2) | A12 | U1 | U2 | W | Conf. Index (CI) | CI > Threshold |
|---|---|---|---|---|---|---|---|
| Uncom1 | 1 | 7 | -3.1 | -2.2 | 0.2 | 0.5 | Y |
| Uncom1 | 2 | 2 | -6.2 | -5.03 | 0.2 | -1 | N/A |
| Uncom1 | 3 | 3 | -8.03 | -1.06 | 0.2 | 0.7 | Y |
| ... | ... | ... | ... | ... | ... | ... | ... |
| Uncom1 | N | 6 | -1.3 | -6.2 | 0.2 | 0.3 | N |
| Uncom2 | 1 | 1 | -1.6 | -1.1 | 0.4 | 0.2 | N |
| Uncom2 | 2 | 5 | -3.4 | -3.09 | 0.4 | 0.3 | N |
| Uncom2 | 3 | 8 | -7.3 | -4.22 | 0.4 | 0.4 | N |
| ... | ... | ... | ... | ... | ... | ... | ... |
| Uncom2 | N | 3 | -2.2 | -7.17 | 0.4 | 0.1 | N |
| (Other Uncommon Words)... | (Corpus Words)... | ... | ... | ... | ... | ... | ... |
| UncomM | 1 | 2 | -4.3 | -1.29 | 0.2 | 0.2 | N |
| UncomM | 2 | 3 | -2.5 | -3.01 | 0.2 | 0.8 | Y |
| UncomM | 3 | 7 | -9.04 | -2.18 | 0.2 | 0.5 | Y |
| ... | ... | ... | ... | ... | ... | ... | ... |
| UncomM | N | 4 | -3.06 | -6.37 | 0.2 | 0.9 | Y |

Confusion Index Calculation 500

| Input1 (x) Acoustic Score (A12) 502 | Lang. Score (u1+u2) 504 | Weight Factor(w) 506 | Input2 (y) w(u1+u2) 508 | Output Conf. Index 1/(e^x-e^-y) 510 | Denom. (e^x-e^-y) 512 | e^x 514 | e^y 516 |
|---|---|---|---|---|---|---|---|
| 2 | -9.06 | 0.2 | -1.812 | 0.789655174 | 1.266375543 | 7.389056099 | 6.122680556 |
| 2 | -8.66 | 0.2 | -1.732 | 0.575668918 | 1.737109594 | 7.389056099 | 5.651946505 |
| 2 | -8.26 | 0.2 | -1.652 | 0.460478958 | 2.171651891 | 7.389056099 | 5.217404208 |
| 2 | -7.86 | 0.2 | -1.572 | 0.38868386 | 2.572784989 | 7.389056099 | 4.81627111 |
| 2 | -7.46 | 0.2 | -1.492 | 0.339780382 | 2.943077509 | 7.389056099 | 4.44597859 |
| 2 | -7.06 | 0.2 | -1.412 | 0.304423216 | 3.284900587 | 7.389056099 | 4.104155512 |
| 2 | -6.66 | 0.2 | -1.332 | 0.277743595 | 3.600443057 | 7.389056099 | 3.788613041 |
| 2 | -6.26 | 0.2 | -1.252 | 0.256955432 | 3.89172547 | 7.389056099 | 3.497330629 |
| 2 | -5.86 | 0.2 | -1.172 | 0.240349197 | 4.160613027 | 7.389056099 | 3.228443072 |
| 2 | -5.46 | 0.2 | -1.092 | 0.226817673 | 4.408827526 | 7.389056099 | 2.980228573 |
| 2 | -5.06 | 0.2 | -1.012 | 0.215612111 | 4.637958387 | 7.389056099 | 2.751097712 |
| 2 | -4.66 | 0.2 | -0.932 | 0.206207981 | 4.849472831 | 7.389056099 | 2.539583268 |
| 2 | -4.26 | 0.2 | -0.852 | 0.19822685 | 5.044725271 | 7.389056099 | 2.344330828 |
| 2 | -3.86 | 0.2 | -0.772 | 0.191388806 | 5.22496599 | 7.389056099 | 2.164090109 |
| 2 | -3.46 | 0.2 | -0.692 | 0.18548233 | 5.391349145 | 7.389056099 | 1.997706954 |
| 2 | -3.06 | 0.2 | -0.612 | 0.180344597 | 5.544940154 | 7.389056099 | 1.844115945 |
| 2 | -2.66 | 0.2 | -0.532 | 0.175848214 | 5.686722526 | 7.389056099 | 1.702333573 |
| 2 | -2.26 | 0.2 | -0.452 | 0.171892067 | 5.81760415 | 7.389056099 | 1.571451949 |
| 2 | -1.86 | 0.2 | -0.372 | 0.168394872 | 5.938423118 | 7.389056099 | 1.450632981 |

Confusion Index Calculation
600

| Input1 (x) Acoustic Score (A12) | Lang. Score (u1+u2) | Weight Factor(w) | Input2 (y) w(u1+u2) | Output Conf. Index 1/(e^x-e^-y) | Denom. (e^x-e^-y) | e^x | e^y |
|---|---|---|---|---|---|---|---|
| 7 | -7.87 | 0.2 | -1.574 | 0.000915913 | 1091.807245 | 1096.633158 | 4.825913291 |
| 7 | -7.47 | 0.2 | -1.494 | 0.000915601 | 1092.178279 | 1096.633158 | 4.454879445 |
| 7 | -7.07 | 0.2 | -1.414 | 0.000915314 | 1092.520786 | 1096.633158 | 4.112372037 |
| 7 | -6.67 | 0.2 | -1.334 | 0.00091505 | 1092.836961 | 1096.633158 | 3.79619785 |
| 7 | -6.27 | 0.2 | -1.254 | 0.000914805 | 1093.128826 | 1096.633158 | 3.504332289 |
| 7 | -5.87 | 0.2 | -1.174 | 0.00091458 | 1093.398252 | 1096.633158 | 3.234906419 |
| 7 | -5.47 | 0.2 | -1.094 | 0.000914372 | 1093.646963 | 1096.633158 | 2.986194995 |
| 7 | -5.07 | 0.2 | -1.014 | 0.00091418 | 1093.876553 | 1096.633158 | 2.756605413 |
| 7 | -4.67 | 0.2 | -0.934 | 0.000914003 | 1094.088491 | 1096.633158 | 2.544667517 |
| 7 | -4.27 | 0.2 | -0.854 | 0.000913839 | 1094.284134 | 1096.633158 | 2.349024181 |
| 7 | -3.87 | 0.2 | -0.774 | 0.000913689 | 1094.464736 | 1096.633158 | 2.16842262 |
| 7 | -3.47 | 0.2 | -0.694 | 0.000913549 | 1094.631452 | 1096.633158 | 2.001706366 |
| 7 | -3.07 | 0.2 | -0.614 | 0.000913421 | 1094.785351 | 1096.633158 | 1.847807867 |
| 7 | -2.67 | 0.2 | -0.534 | 0.000913303 | 1094.927417 | 1096.633158 | 1.705741647 |
| 7 | -2.27 | 0.2 | -0.454 | 0.000913193 | 1095.05856 | 1096.633158 | 1.574597997 |
| 7 | -1.87 | 0.2 | -0.374 | 0.000913092 | 1095.179621 | 1096.633158 | 1.45353715 |
| 7 | -1.47 | 0.2 | -0.294 | 0.000912999 | 1095.291375 | 1096.633158 | 1.341783904 |
| 7 | -1.07 | 0.2 | -0.214 | 0.000912913 | 1095.394536 | 1096.633158 | 1.238622655 |
| 7 | -0.67 | 0.2 | -0.134 | 0.000912834 | 1095.489766 | 1096.633158 | 1.14339282 |

SYSTEM AND METHOD TO IMPROVE PERFORMANCE OF A SPEECH RECOGNITION SYSTEM BY MEASURING AMOUNT OF CONFUSION BETWEEN WORDS

BACKGROUND

Significant efforts have been made by companies and academia to measure (or quantify) the confusion between similar sounding words to effectively resolve or minimize the conflicts between them. To date, such measurements have been based on an approach using the acoustic (sound) similarities between the words. However, there are significant challenges with such an acoustic-based approach.

While current approaches using acoustic similarities to identify confusing words, the acoustic similarity approach is a "one size fits all" approach, i.e., any two words that have the same acoustic sound differences (sound the same or have the same pronunciation) get treated alike (or get assigned the same level confusion). Such an approach does not provide any insight into the degree or level of confusion between the similar sounding words and how significantly such confusion can affect the models (e.g., language models and the like).

Accordingly, it would be desirable to have a system and method that overcomes the shortcomings of the prior art and provides an approach that measures the degree of confusion between words to enable more intelligent handling of similar sounding words to reduce the negative effects on language models and Automatic Speech Recognition (ASR) systems that use the models.

BRIEF DESCRIPTION OF THE DRAWINGS

FIG. 1B is a sample list of uncommon words and corresponding phonetically similar potential corpus words, in accordance with embodiments of the present disclosure.

FIG. 2C is a sample confusion index parameter table showing input words (Word1, Word2) and output parameters and calculations, in accordance with embodiments of the present disclosure.

FIG. 5A is a table showing various values of a confusion index calculation in response to a first set of input values, in accordance with embodiments of the present disclosure.

FIG. 6A is a table showing various values of a confusion index calculation in response to a second set of input values, in accordance with embodiments of the present disclosure.

DETAILED DESCRIPTION

Figure 1A:
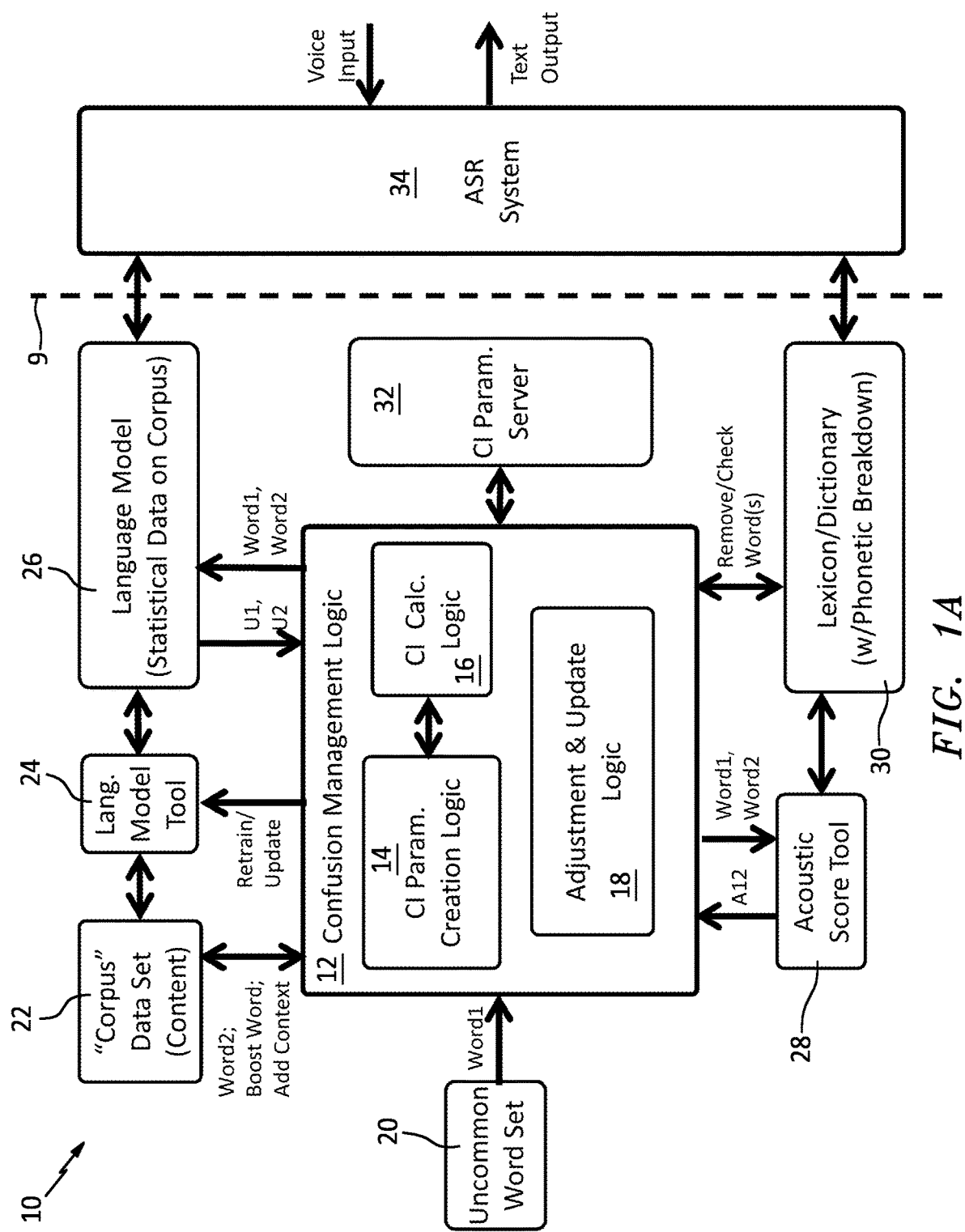
FIG. 1A is a top-level block diagram of components of a word confusion measurement system, in accordance with embodiments of the present disclosure.

As discussed in more detail below, in some embodiments, the present disclosure is directed to methods and systems for measuring the degree of confusion between words, and, in particular, calculating a confusion index indicative of this measurement. The confusion index of the present disclosure, as discussed herein, may be used to improve the performance of automatic speech recognition (ASR) systems, or computer speech recognition systems, or speech-to-text (STT) systems, or large vocabulary continuous speech recognition systems (CVCSR), collectively ASRs, which use corpus data sets with corresponding language models, and lexicons, to interpret voice commands (or utterances) and provide a text output indicative of the word(s) spoken. The present disclosure uses a combination of acoustics and language understanding to calculate a confusion index for use in handling word/word or word/phrase or phrase/phrase confusions. The present disclosure measures the degree of confusion by applying language knowledge of the words (i.e., how "common" each word is in the domain or corpus), in addition to acoustic (or phonetic) similarity of the words, to identify different types/levels/values of confusions and treat them differently.

For example, an uncommon word being confused with another uncommon word (e.g., VON/VAUGHAN=uncommon/uncommon), will do less harm than an uncommon word being confused with a common word (e.g., STURRIDGE/STORAGE=uncommon/common). The present disclosure identifies this distinction and handles them differently, i.e., it ensures the later case is handled properly. The present disclosure provides a way to identify or classify such cases depending upon the severity of confusion and provides an approach to resolve different kinds of word conflicts.

In particular, the present disclosure measures the acoustic distance (or "acoustic score") between the two input words to determine how phonetically similar they are and determines a "language score" component by calculating the unigram frequencies (or word frequency) of the input words, and then combines the two frequencies to determine a rate the confusion or confusion index (or confusion score). The disclosure also provides a weighting factor for the language score component to help balance or provide the proper relationship (or influence or impact) between the acoustic (phonetic) portion and the language portion that together make up the confusion index (CI).

The resulting confusion index CI is then used to classify the level of confusion and take steps to reduce it. If confusion is too high (or hazardous), such as an uncommon word that has similar pronunciation as a common word, e.g. BODE/BOWED=uncommon/common, the present disclosure adds "context" to the common word to resolve the conflict to avoid an absurd or erroneous recognition. If the confusion is between two uncommon words e.g., JOZEF/JOSEPH=uncommon/uncommon, the present disclosure may "boost" one word over the other in the domain of words (or corpus) depending on what is desired to be recognized, without significantly impacting the language model.

The Confusion Index (CI) may also be used to adjust the lexicon (or dictionary) for a given application, e.g., by removing unimportant or low frequency words from the lexicon. The Confusion Index (CI) provides insight into all word confusions and may keep or remove words from the lexicon depending upon their application. The CI may also be used for multi-word confusion (e.g., 2-words/2-words or 1-word/2-words or 3-words/3-words, and the like) by allowing for n-gram language frequency determinations or scores.

In some embodiments, the present disclosure allows the merging (or incorporation or addition or combination) of a generic (or initial or general) corpus data set or language model with a new domain-specific data set or language model having new words (e.g., uncommon words), or having words with much higher likelihood of occurrence than in the original generic corpus data set, which could impact the accuracy of the language model and the corresponding ASR results. The resulting data set may be referred to herein as the corpus data set.

Referring to FIG. 1A, various components (including devices, logic or servers) 10 of the present disclosure for measuring confusion between words (including adjusting or updating a language model and a lexicon accordingly), is shown to the left of dashed line 9, and includes Confusion Management Logic 12, which may be viewed as having three main components: Confusion Index (CI) Parameter Table Creation Logic 14, which interfaces with (or calls) CI Calculation Logic 16, and Adjustment & Update Logic 18. The Confusion Management Logic 12 receives (or reads) data or words/phrases from a plurality of data sources, including an Uncommon Word List 20 and a "Corpus" Data Set 22. In particular, the Confusion Management Logic 12 receives input words (e.g., Word1, Word2) from the Uncommon Word List 20 and the Corpus data set 22, respectively, and calculates a Confusion Index (CI) or Confusion Score using parameters (U1,U2, and A12) received from a Language Model 26 and an Acoustic Score Tool 28, respectively and a weighting factor received from a CI Parameter table. The Confusion Management Logic 12 provides the input words to the Language Model and receives a unigram score (or word frequency) for each word U1, U2. The Language Model 26 is a statistical data representation of the Corpus created by a known Language Model Tool 24, e.g., SRILM (or Stanford Research Institute Language Model) tool, in response to commands from the Confusion Management Logic 12, discussed more hereinafter. Other language tools may be used if desired, such as KenLM (or Kneser-Ney Language Model) and IRSTLM (or Istituto per la Ricerca Scientifica e Tecnologica Language Model), or any other language model that provides the desired function and performance. In the case where at least one of the input words comprises a phrase or plurality of words, the unigram would be an n-gram score for that input word frequency.

In addition, the Confusion Management Logic 12 provides the input words to the Acoustic Score Tool, which calculates an acoustic distance (e.g., Levenshtein Distance) score, or acoustic score, A12, between input words Word1, Word2 using a known string edit distance tool from a software application library, such as a Python library, discussed more hereinafter. The Acoustic Score Tool 28 interfaces with a Lexicon (or Dictionary) 30 associated with a given application or domain, which includes a phonetic breakdown of the input words, to provide the acoustic distance (or score) A12 between the two input words, indicative of how similar the pronunciation is between the words. The acoustic score is related to the number of letter differences between the phonetic breakdown of the two words. Thus, the lower the acoustic score, the more similar the pronunciations.

The Confusion Management Logic 12 also updates (e.g., stores or removes) data or words in the Lexicon 30 and in the Corpus Data Set 22. In addition, the Confusion Management Logic 12 stores and retrieves data from a CI Parameters Server 32 including various Confusion Index (CI) calculation parameters as discussed herein.

The Corpus Data Set 22 may be a collection of text data that makes up the entire domain space on which the system is operating. For example, for a sports-based language model, the Corpus Data Set 22 may be a text file having all of the scripts and closed caption text from all the sports shows over a predetermined period of time. For a more focused language model, e.g., football, the Corpus 22 may be a text file having all of the scripts and closed caption text from all the football games, pre-game and post-game shows, and related shows over a predetermined period of time.

The Language Model 26 and Lexicon 30 (and updates thereto) may be read by a known Automatic Speech Recognition (ASR) system 34, or computer speech recognition, or speech to text (STT) system, or a large vocabulary continuous speech recognition system (CVCSR), collectively referred to herein as an Automatic Speech Recognition (or ASR), which uses a Language Model 26 and a Lexicon 30 to interpret voice commands (or utterances) and provide a text output indicative of the word(s) spoken.

Referring to FIG. 1B, a table 100 having the Uncommon Word List 20 is shown. The table 100 also shows a listing of phonetically similar potential "corpus" words 104 for each uncommon word in the Uncommon Word List 20. For example, the uncommon word Aaron (the name of a player on a soccer team) may be confused with other names such as Aron, Arron, and Eran. Also, the uncommon word Ariel (name of a character in a Disney movie "The Little Mermaid") may be confused with the common word Aerial (such as used in "aerial" photography).

In some embodiments, the system of the present disclosure may be used to add the Uncommon Word List 20 to the Language Model to make sure the new words do not get confused with words in the Corpus 22. For a world cup soccer-based sports-themed Language Model, the Uncommon Word List 20 may include the names of all the players on all the world cup soccer teams, which is desired to be added to the Corpus to avoid having an embarrassing interpretation of a player's name. For example, if a player's name is "Hed" (which would be an uncommon word in the Corpus), it would be desired to not have it be confused with the common word "Head" which may also likely be in the Corpus (e.g., "he will head the ball").

Figure 2A:
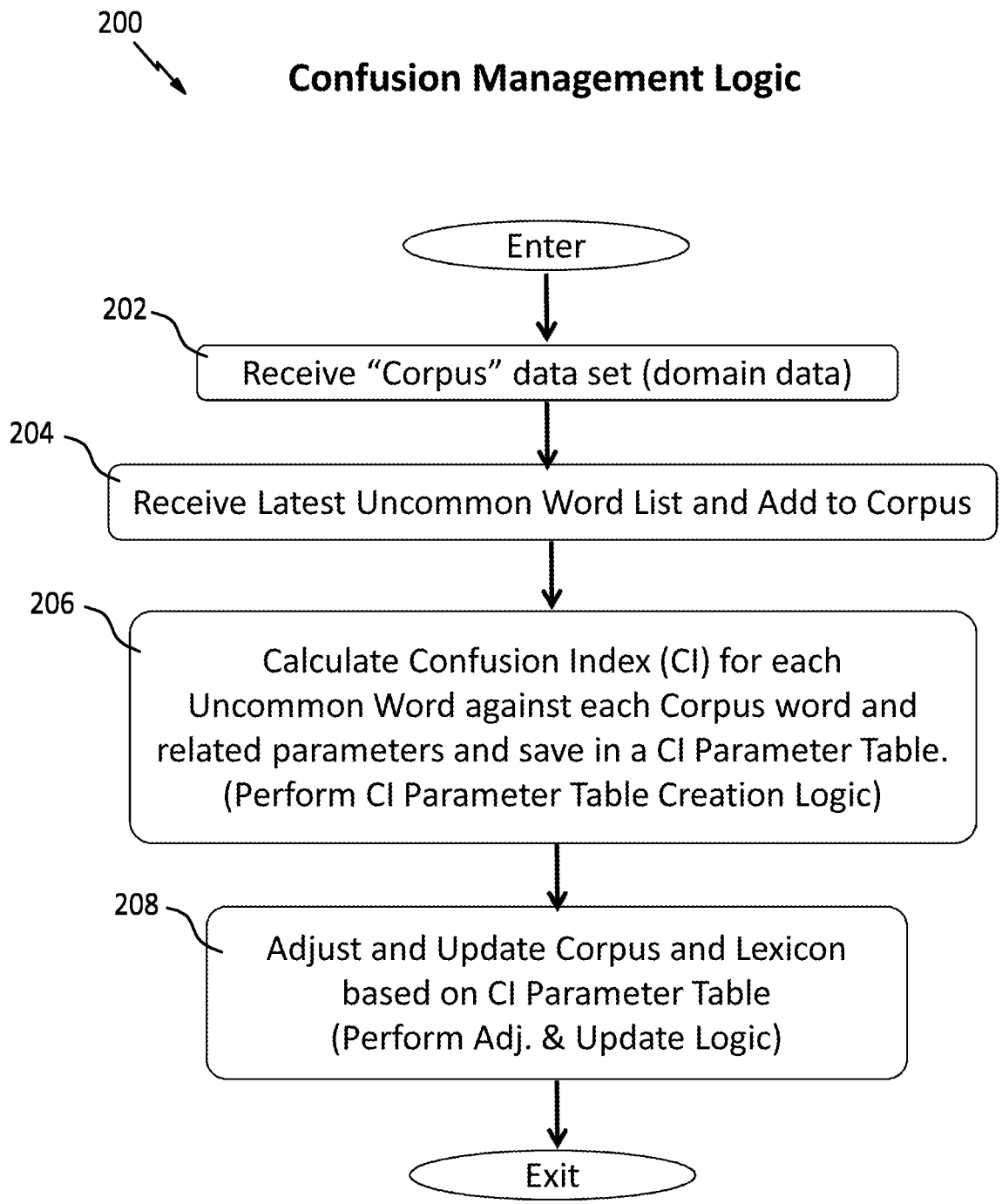
FIG. 2A is a flow diagram of one embodiment of one of the components in FIG. 1A, in accordance with embodiments of the present disclosure.

Referring to FIG. 2A, a flow diagram 200 illustrates one embodiment of a process or logic for implementing the calculation of the confusion index or score and for using the score to adjust the Lexicon and Language Model, which may be implemented by the Confusion Management Logic 12 (FIG. 1A). The process 200 begins at a block 202, which receives the Corpus Data Set 22 having the data to be reviewed and analyzed for confusion against the Uncommon words. Next, block 204 receives the latest Uncommon Word List and adds it to the Corpus 22.

Figure 2B:
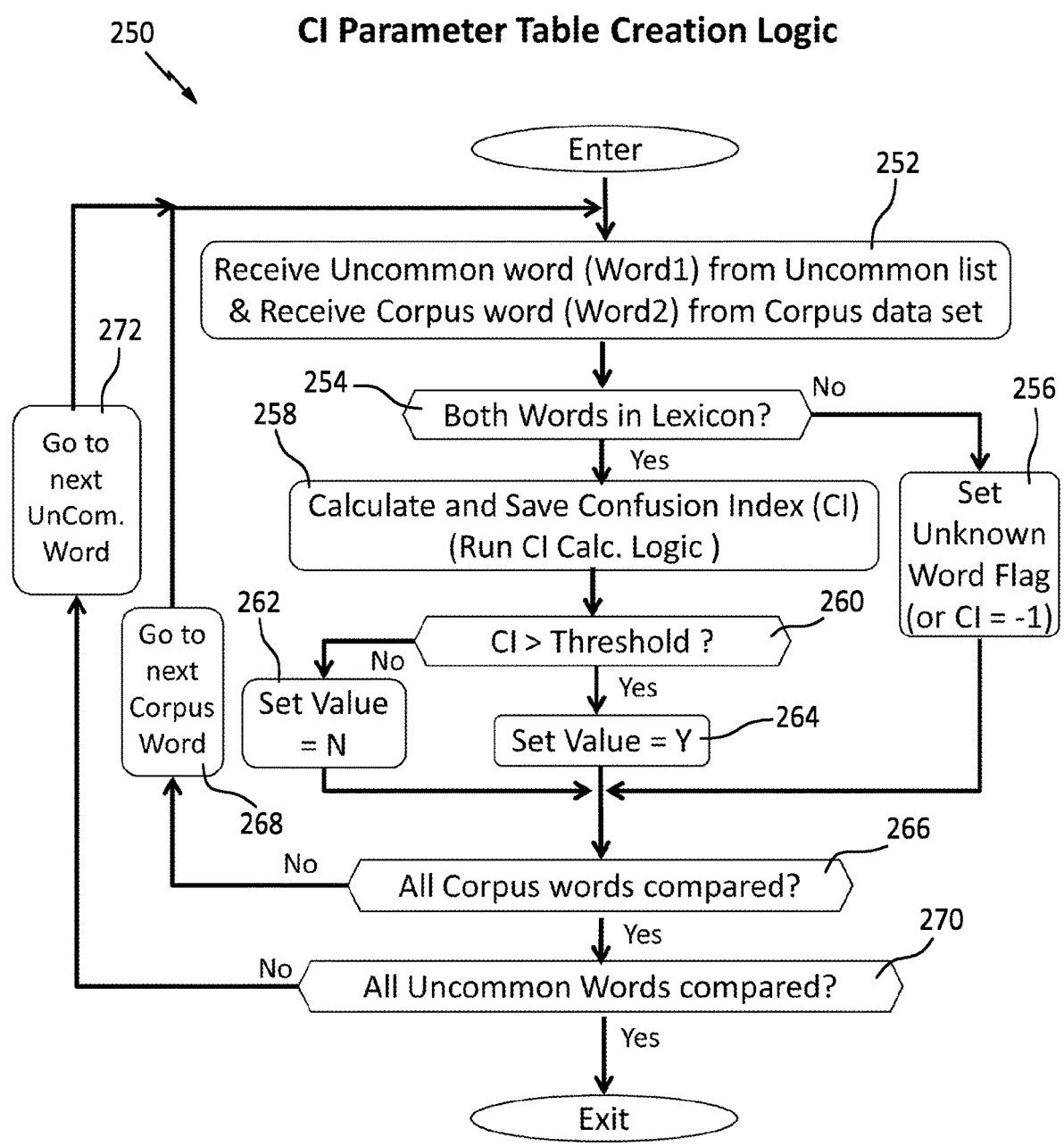
FIG. 2B is a more detailed flow diagram of one embodiment of one of the components in FIG. 2A, in accordance with embodiments of the present disclosure.

Next, block 206 calculates the Confusion Index (CI) for each Uncommon Word against each Corpus word by performing the CI Parameter Table Creation Logic 250 (FIG. 2B). Next, block 208 adjusts and updates the Corpus and Lexicon based on the values in the CI Parameter Table by performing the Adjustment and Update Logic 400 (FIG. 4), and then the logic 200 exits.

Referring to FIG. 2B, a flow diagram 250 illustrates one embodiment of a process or logic of block 206 (FIG. 2A) of the Confusion Management Logic 12 for calculating the Confusion Index (CI) and related parameters for each of the Uncommon Words List 20 against each of the words in the Corpus Data Set 22 and saving results in a CI Parameter Table 280 (FIG. 2C), which may be implemented by the CI Parameter Table Creation Logic 14 (FIG. 1A). The process 250 begins at block 252, which receives a first input word (Word1), such as an Uncommon Word (e.g., Ucomm1) from the Uncommon Word List 20 and receives a second input word (Word2), such as a word (e.g., Corpus1) from the Corpus Data Set 22. Next, block 254 determines if both words (Word1,Word2) are in the Lexicon Data Set 30. If not, block 256 sets CI=−1 as an Unknown Word flag and the logic 250 proceeds to step 266. If the result of block 254 is Yes, both words are in the Lexicon and block 258 calculates and saves the Confusion Index (CI) and related parameters for the current input words (Word1,Word2) in the CI Parameter Table 280 (FIG. 2C), by performing CI Calculation Logic (FIG. 3), discussed hereinafter.

Next, block 260 determines whether CI is greater than a confusion index Threshold (Tc), e.g., Tc=0.3. Other values for the confusion Threshold (Tc) may be used if desired. If not, block 262 sets a Confusion Flag value=N (for no confusion) and the logic 250 proceeds to step 266. If the result of block 260 is Yes, block 264 sets a Confusion Flag value=Y (for yes confusion) and the logic 250 proceeds to step 266. Next, or after block 262, or after block 256, block 266 determines if CI has been calculated for the current Uncommon word against all the Corpus words. If not, block 268 goes to the next Corpus word in the Corpus Data Set 22 (e.g., Corpus2, Corpus3, Corups4, . . . to CorpusN), and the logic 250 proceeds back to block 252 to receive the next Corpus word until all the words in the Corpus have been compared to the first Uncommon Word (Uncom1), shown as Uncommon Word comparison group 293.

The value of the confusion Threshold (Tc) may be a constant value or may vary based on certain conditions or factors, such as the value of the acoustic score A12, the language score (U1+U2), the weighted language score W(U1+U2), size or type of the corpus data set or uncommon words list data set, or other factors, and may have different values for different input words. In some embodiments, the confusion Threshold (Tc) may have an initial default value and may be determined or adjusted over time (or in real-time) using machine learning to provide corpus adjustment that has the desired result.

When all the words in the Corpus have been compared to the first Uncommon Word (Uncom1), the result of block 266 will be Yes and block 270 determines if CI has been calculated for all the Uncommon words. If not, block 272 goes to the next Uncommon word in the Uncommon Word List 20 (e.g., Uncom2, Uncom3, Uncom4, . . . to UncomM), and the logic 250 proceeds back to block 252 to receive the next Uncommon word in the list until all the Uncommon words in the Uncommon Word List 20 have been compared to all the Corpus words, shown as Uncommon Word comparison groups 294-296 in FIG. 2C, and then the logic 250 exits.

Referring to FIG. 2C, the Confusion Index Parameter Table 280 is shown, having columns 282-292, respectively, for the Uncommon Word List 20 (Word1), the Corpus Word or word from the Corpus Data Set 22 (Word2), the Acoustic Score A12 between Word1 and Word2, the probability U1 or likelihood for Word1 appearing in the Corpus, the probability U2 or likelihood for Word2 appearing in the Corpus, the weighting factor W (for creating a weighted total probability or weighted language score), the Confusion Index (CI) 290, and a confusion flag indicating (Y/N) whether CI is greater than the CI Threshold (Tc) used in the logics described herein, e.g., the process 250 (FIG. 2B).

Figure 3:
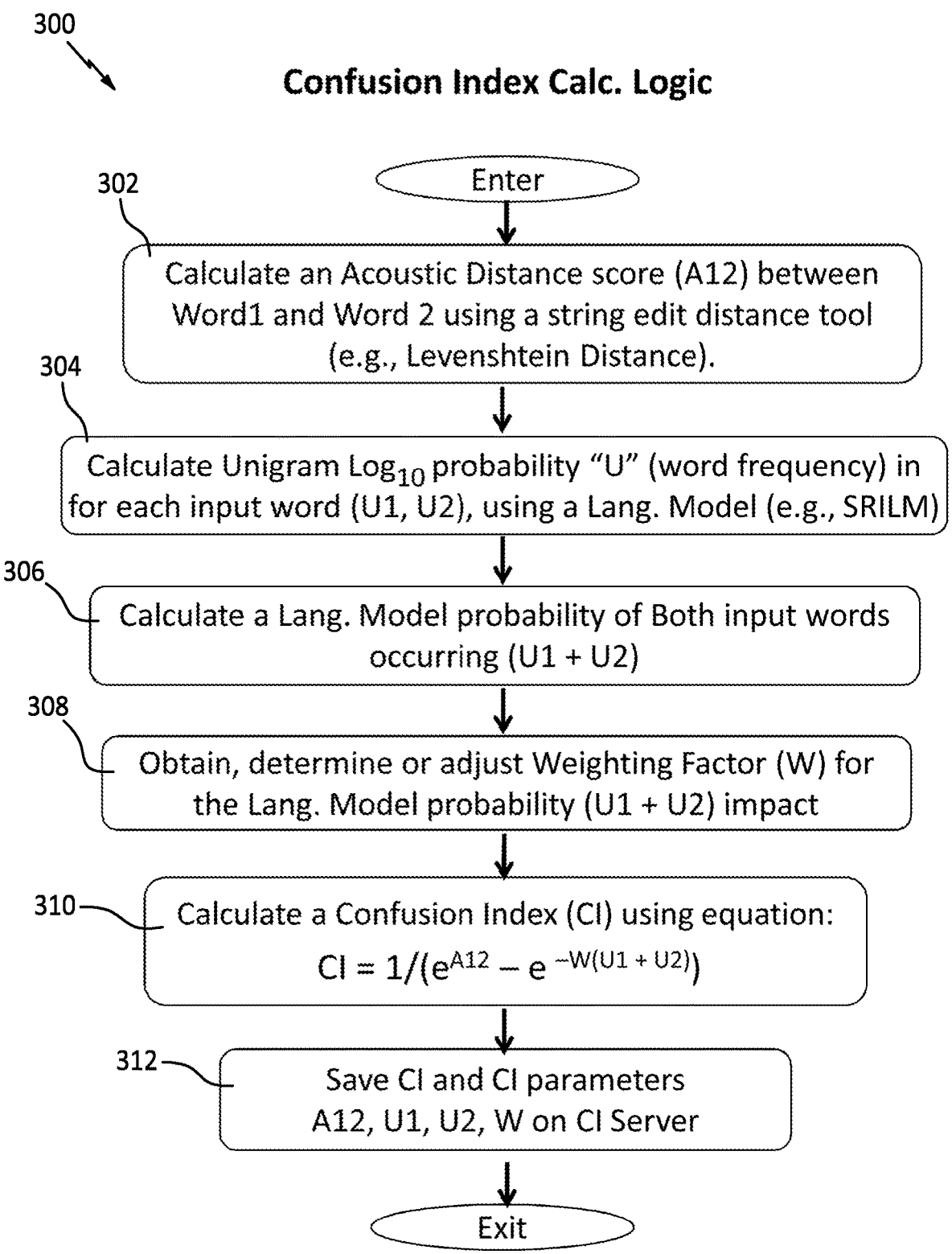
FIG. 3 is a more detailed flow diagram of one embodiment of one of the components in FIG. 1A, in accordance with embodiments of the present disclosure.

Referring to FIG. 3, a flow diagram 300 illustrates one embodiment of a process or logic of block 258 (FIG. 2B) for calculating the confusion index (CI) for two input words (Word1, Word2) and related parameters and saving results in a CI Parameter Table 280 (FIG. 2C), which may be implemented by the CI Calculation Logic 14 (FIG. 1A). The process 300 begins at block 302, which calculates an acoustic distance (e.g., Levenshtein Distance) score (A12) between input words Word1, Word2 using a string edit distance tool from a software application library, such as a Python library. Other string edit distance scores may be used if desired, such as Gestalt Pattern Matching, Hamming distance, Jaro-Winkler distance, Lee distance, Levenshtein automaton, Wagner-Fischer algorithm, or any other acoustic distance score that provides the desired function and performance. The score is calculated by determining the string edit distance between the lexical representation of the input words Word1,Word2. The higher the number for the acoustic score A12, the more distant the words are phonetically. The logic 300 calls the Acoustic Score Tool 28 with the two input words Word1, Word2, and the tool 28 provides the resulting acoustic score A12 to the logic 300.

Next, block 304 calculates a unigram Log 10 probability (or word frequency) for each input word (U1, U2), respectively, using the Language Model 26, e.g., SRILM tool. Other language tools may be used if desired, such as KenLM and IRSTLM, or any other language model that provides the desired function and performance.

Next, block 306 obtains the weighting factor from the CI Parameter Table and calculates the weighted Lang. Model probability (or likelihood) of both input words occurring W (U1+U2). Next, block 310 calculates the Confusion Index (CI) between the input words, using the below equation:

$$CI = \frac{1}{(e^{A_{12}} - e^{-W(U_1+U)})} \qquad \text{Eq. 1}$$

Where A12 is the acoustic distance between Word1 and Word2; U1 and U2 are the unigram values (word frequency) of Word1 and Word2, respectively; and W is the weighting factor which determines the influence (or impact) of the total language score (U1+U2) on the resulting output value of CI. The exponential factor A12 may be referred to as an "acoustic score" (or phonetic score), where the smaller the number, the more alike the words sound (similar pronunciation). The exponential factor (U1+U2) may be referred to herein as a "language score" and the exponential factor W(U1+U2) as a "weighted language score", which is an indication of the likelihood of the words appearing in the corpus, where U1 and U2 may each be represented as the Log 10 probability of the associated word occurring in the corpus, and, thus, may be represented as negative numbers, e.g., from negative infinity to 0, corresponding to probabilities (p) of 0 to 1, respectively. In some embodiments, a high (large) negative number for the language score (U1+U2) corresponds to a high likelihood of occurrence in the corpus and a small negative number corresponds to a low likelihood of occurrence in the corpus. Next, block 312 saves the output value CI and the CI parameters (or factors) A12, U1, U2, W, and any other needed parameters, and the logic 300 exits.

Other values, relationships, and polarities (or +/− signs) may be used for the word probabilities or frequencies or likelihoods or unigram (or n-gram) values associated with the language score if desired, provided it provides the desired effect or impact on the confusion index (CI) value and the desired balance or relationship between the acoustic score and the language score in the confusion index (CI) value. In particular, the CI value for words that sound alike (e.g., small acoustic score value) and have a high likelihood of occurring in the corpus will be higher than the CI value for words that sound alike and do not have a high likelihood of occurring in the corpus. In some embodiments, the language score or (U1+U2) or word frequency or likelihood may be determined based on word count or word count ratio, e.g., #times a word appears in corpus divided by total #corpus words, and the resulting value may be scaled or normalized (e.g., to make it range from 0 to 1 or other values), to provide the desired impact or influence on the CI value. Also, the value of A12 may also be scaled or normalized to provide the desired impact or influence on the CI value. Also, the terms probability, likelihood, n-gram/unigram, and word frequency, as used herein, may all have a similar meaning provided it results in the desired effect or impact on the confusion index (CI) value and the desired balance or relationship between the acoustic score and the language score in the confusion index (CI) value, as described herein. Also, the value of CI may be scaled or normalized as desired. Also, the correlation of CI value to actual confusion may be set as desired, e.g., high CI value=high confusion, low CI value=low confusion, as described in the examples herein, or it may be set as the opposite if desired.

The value of the weighting factor W may be a constant value or may vary based on the certain conditions such as the value of the acoustic score A12 or the language score (U1+U2) or other factors. For example, in some embodiments, W may have a lower value (e.g., W=0.2) when the acoustic score A12 is less than a predetermined score value, e.g., 4, and W may have a higher value (e.g., W=0.6) when the acoustic score A12 is greater than the predetermined score value, e.g., 4, to allow the language score (U1+U2) to have the desired impact on the CI score based on. Other values for W may be used if desired. In some embodiments, the weighting factor W may have an initial default value and may be determined or adjusted over time (or in real-time) using machine learning to provide values of CI that have a desired influence or impact of the acoustic score and the language score on the CI value.

Figure 4:
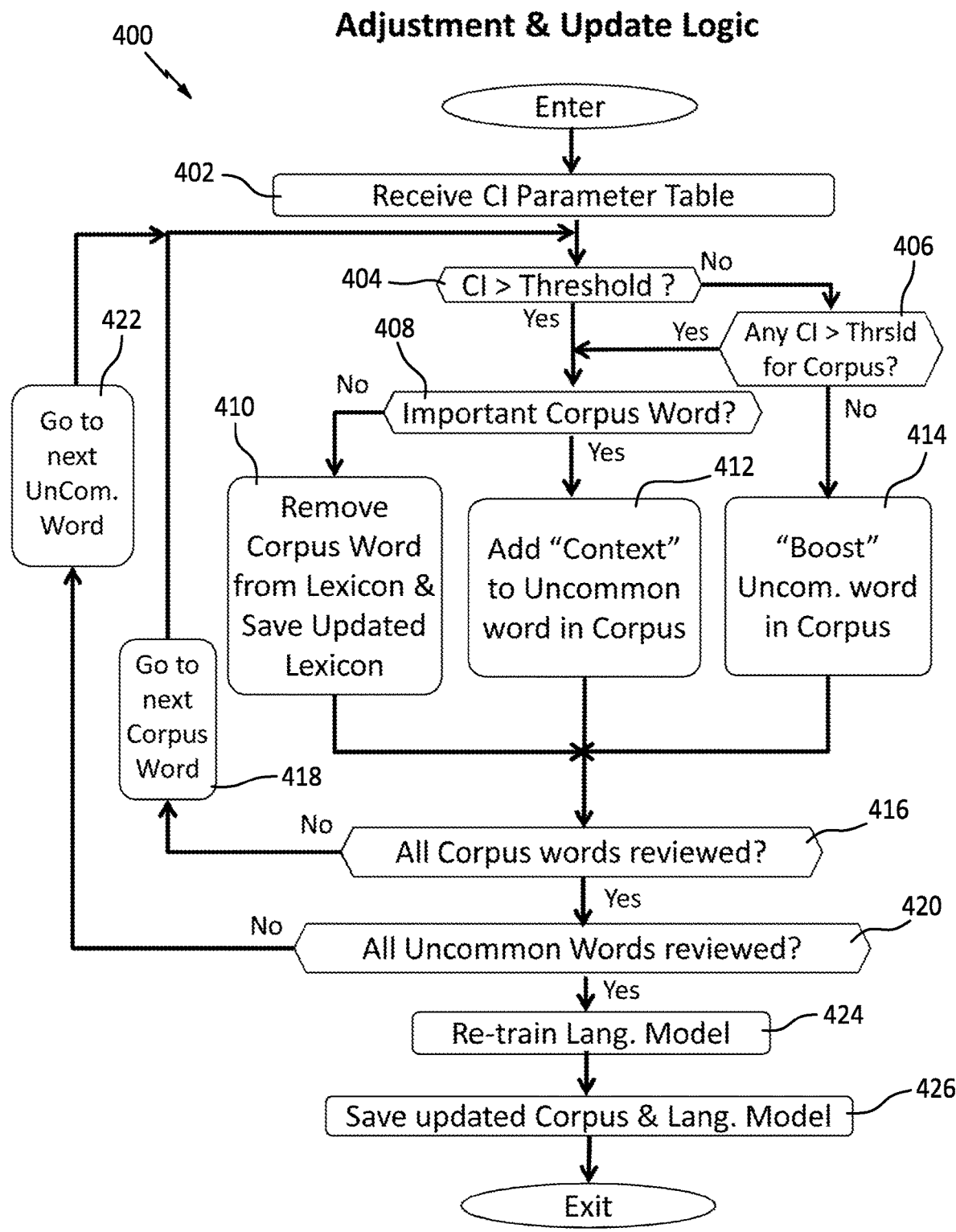
FIG. 4 is a more detailed flow diagram of one embodiment of one of the components in FIG. 1A, in accordance with embodiments of the present disclosure.

Referring to FIG. 4, a flow diagram 400 illustrates one embodiment of a process or logic of block 208 (FIG. 2A) of the Confusion Management Logic 12 for adjusting and updating the Lexicon 30 and Corpus 22 based on the CI values, which may be implemented by the Adjustment & Update Logic 18 (FIG. 1A). The process 400 begins at block 402, which receives the CI Parameter Table 280 (FIG. 2C) having the values for CI and for the CI parameters A12, U1, U2, W. Next, block 404 determines whether the Confusion flag (column 292 in table 280) is set to Yes (Y). If not, block 406 determines if any CI value for a given Uncommon Word (Word1) is greater than the confusion Threshold (Tc) when compared to the whole Corpus (i.e., for a given Uncommon Word comparison group 293-296). If not, there is no confusion for this uncommon word across the entire corpus, and block 414 artificially "boosts" the Uncommon word in the Corpus by adding a predetermined number of occurrences (e.g., about 100, 1K, 10K, 100K, 1 Million, 10 Million, or other amounts) of the Uncommon Word to the Corpus Data Set and the logic 400 proceeds to block 416, thereby increasing the probability (U1) of that Uncommon Word (Word1) appearing in the Corpus, thereby adjusting the CI value. The number of words to add for a given "boost" may be based at least on the size of the corpus to provide a desired likelihood of occurrence of the word in the corpus, e.g., the larger the corpus data set size, the larger the boost number. Also, the size of the boost may be different based on the word being boosted, if desired.

If the result of block 406 is Yes, or the result of block 404 is Yes, CI> Threshold (Tc), i.e., confusion exists, or CI is not> Threshold (Tc), but at least one CI> Threshold (Tc), i.e., confusion exists, for at least one Uncommon Word in the given Uncommon Word comparison groups 293-296, respectively, sufficient confusion exists, and the logic 400 proceeds to block 408, which determines if the Corpus word (Word2) is an important word for the Corpus. This may be done by determining if the probability U (or word frequency or likelihood) of a corpus word is less than a probability or likelihood Threshold (Tp), e.g., Tp=−5, and the corpus word is not on the Uncommon Word list (i.e., not Word1), then it is not an important corpus word and block 218 removes the word from the Lexicon and saves the updated Lexicon, and then the logic exits. Other values or polarities or ranges for the probability or likelihood Threshold (Tp) may be used if desired. Note, in this example, the higher the negative number the more likely the word is to appear.

The value of the probability or likelihood Threshold (Tp) may be a constant value or may vary based on certain conditions or factors, such as the value of CI, the acoustic score A12, the language score (U1+U2), the weighted language score W(U1+U2), size or type of the corpus data set or uncommon words list data set, or other factors, and may have different values for different input words. In some embodiments, the probability Threshold (Tp) may have an initial default value and may be determined or adjusted over time (or in real-time) using machine learning to provide corpus/lexicon adjustment that have a desired result.

If the result of block 212 is Yes, the Corpus word is an important word for the Corpus (i.e., the word is not an unimportant word), and block 220 adds "context" to the Uncommon word in the Corpus (to help resolve conflicts with common words). This may be done for an uncommon player name (e.g., "Hed") by finding segments of text in the Corpus using a famous player name, e.g., "Messi", who has a high volume of use in the Corpus, and replacing "Messi" with "Hed" in certain quotes or interviews. This may also be referred to as "data augmentation" or "context generation". Other techniques may be used to generate context for important uncommon words where confusion exists with a common word in the Corpus.

After block 410, or block 412, or block 414, the logic proceeds to block 416, which determines if all the Corpus words have been reviewed. If not, block 418 retrieves the next Corpus Word and the logic proceeds back to block 404 (described above) to repeat the process for the next Corpus word until all Corpus words have been reviewed. When all Corpus words have been reviewed for confusion and the Corpus or Lexicon have been appropriately updated, as described above, block 420 determines whether all the Uncommon Words have been reviewed.

If not, block 422 retrieves the next Uncommon Word and the logic 400 proceeds back to block 404 (described above) to repeat the process for the next Uncommon word and all the Corpus words have been reviewed for that Uncommon Word comparison group 293-296 (FIG. 2C). When all Corpus words have been reviewed for confusion for all the current comparison groups 293-296, and the Corpus or Lexicon have been appropriately updated, as described above, the result of block 420 will be Yes and block 424 runs (or performs) a utility to "retrain" (or update) the Language Model. This may be done by calling the Language Model Tool 24 which will review the updated Corpus Data Set 22 (after adding boost words and context) and produce an updated Language Model (statistical data) 26, for use by the ASR System 34.

Figure 5B:
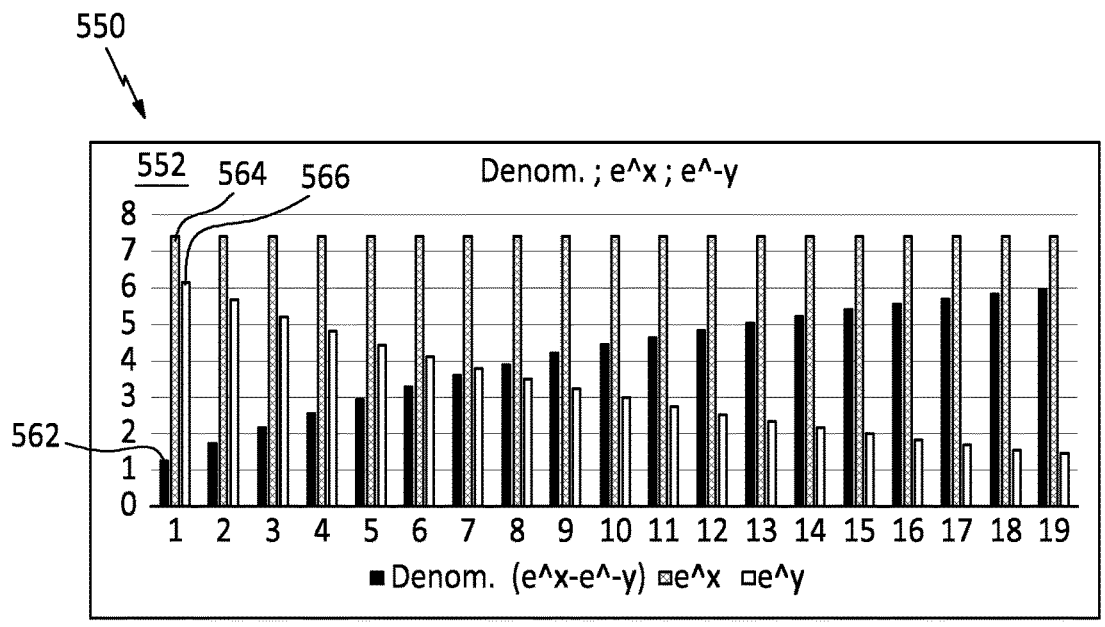
FIG. 5B shows three graphs of data from the table in FIG. 5A, in accordance with embodiments of the present disclosure.
Figure 5B:
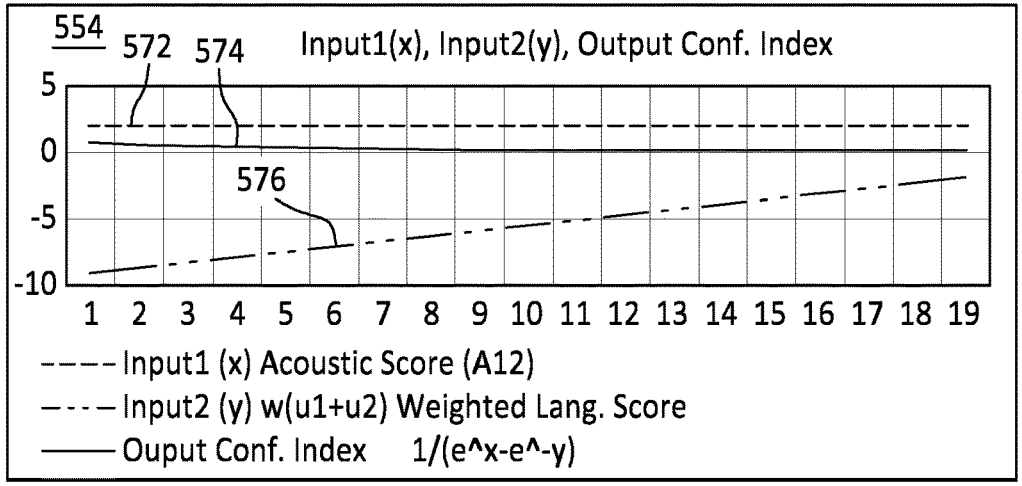
Figure 5B:
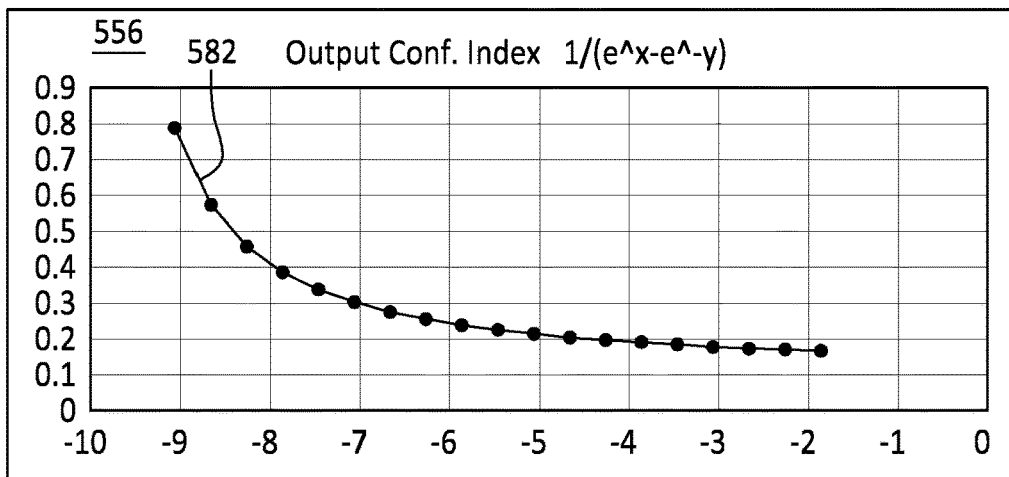
Figure 6B:
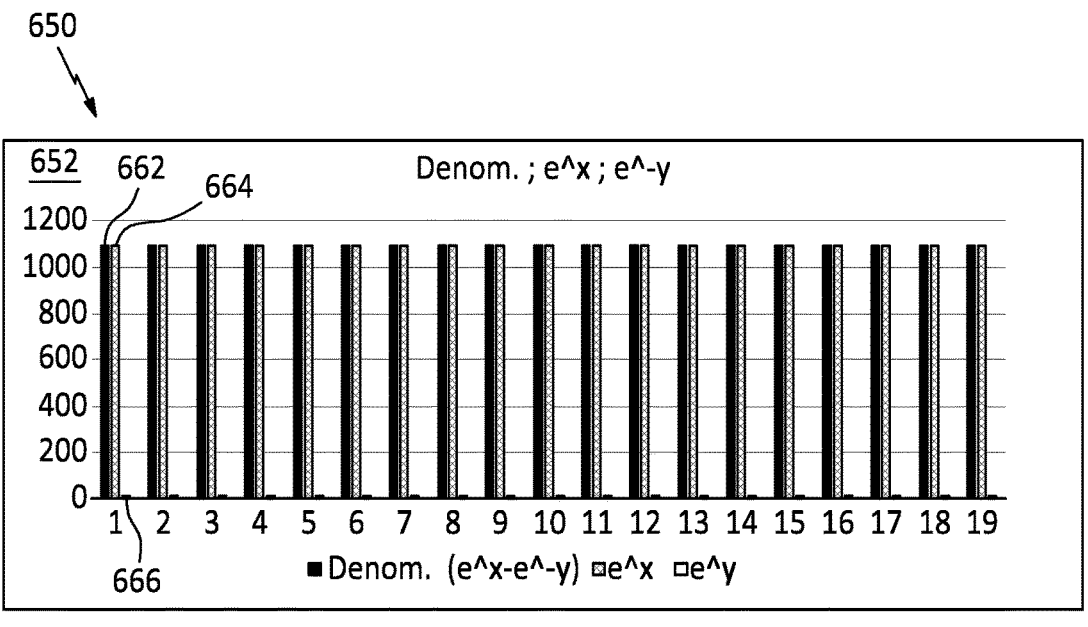
FIG. 6B shows three graphs of data from the table in FIG. 6A, in accordance with embodiments of the present disclosure.
Figure 6B:
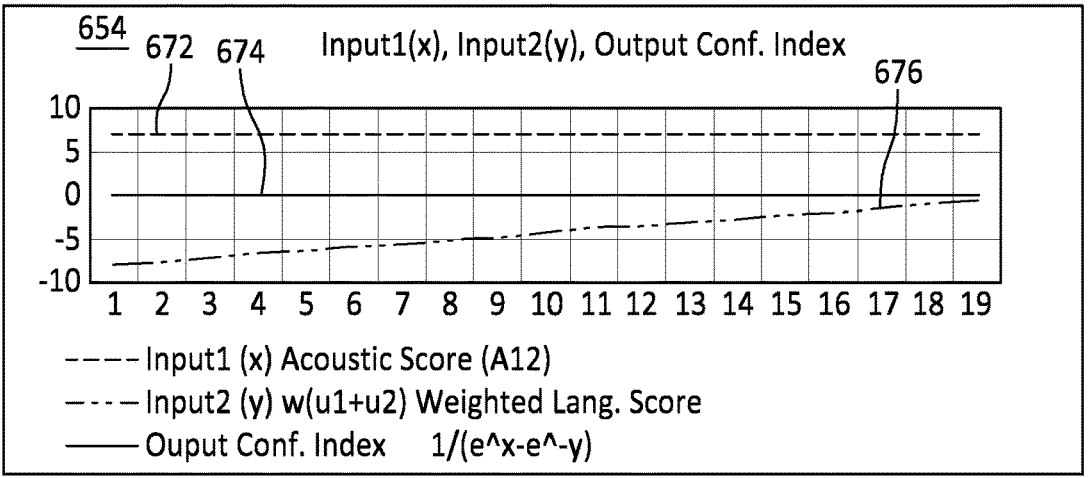
Figure 6B:
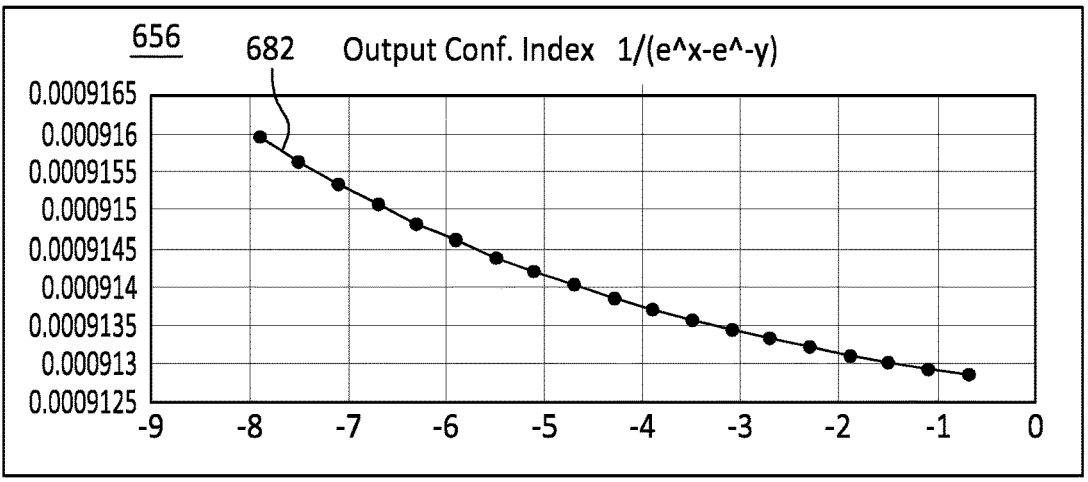

Referring to FIGS. 5A, 5B, 6A, 6B, examples are shown for how the Confusion Index CI equation (Eq. 1) operates to provide the desired influence (or impact) of the acoustic score (or acoustic distance) A12 and language score (or language probability) (U1+U2) on the resulting CI value. Referring to FIGS. 5A, and 6A, tables 500, 600 have columns 502-516 and 602-616, respectively, corresponding to Input 1(x) Acoustic Score or Distance (A12), Language Score or Probability (U1+U2) or word frequency or likelihood, Weighting Factor (W), Input 2 (y) W(U1+U2), Output Confusion Index (CI), Denominator of Eq. 1, $e\char`\^x$ (acoustic score exponential), and $e\char`\^{-y}$ (weighted language score exponential), respectively.

For example, the calculation of CI for a comparison of common and uncommon words, e.g., Storage and Sturridge; and uncommon and uncommon words, e.g., Sturridge and Abated are shown in Tables 500, 600 in FIGS. 5A 6A, respectively, and described below. In these examples, the higher the negative number for U1 or U2 (or word frequency), the higher the likelihood of the word occurring in the corpus.

For table 500 in FIG. 5A, STORAGE/STURRIDGE=common/uncommon, below are the results:

Word1: "STORAGE" phonetic breakdown (from Lexicon): S T AO R EY JH

Word2: "STURRIDGE" phonetic breakdown (from Lexicon): S T UW R EY JH

A12=2 Acoustic score between Word1/Word2 (Levenshtein Distance)

U1=−5.175143 (unigram log 10 probability of STORAGE)

U2=−3.888094 (unigram log 10 probability of STURRIDGE)

W=0.2

CI=0.78965

For table 600 in FIG. 6A, STURRIDGE/ABATED=uncommon/uncommon, below are the results:

Word1: "STURRIDGE" phonetic breakdown (from Lexicon): S T UW R EY JH

Word2: "ABATED" phonetic breakdown (from Lexicon): AH B EY T IH D

A12=7 Acoustic score between Word1/Word2 (Levenshtein Distance)

U1=−3.888094 (log 10 probability of STURRIDGE)

U2=−3.980368 (log 10 probability of ABATED)

W=0.2

CI=0.00092

Referring to table 500 in FIG. 5A, the first row shows the results for the above example for STORAGE/STURRIDGE=common/uncommon, and the remaining rows show the results for the Language Score (U1+U2) values that increment by 0.4 for 18 additional data points, from −9.06 to −1.86, which shows the sensitivity of the CI calculation to variations in the Language Score (U1+U2), while holding the Acoustic Score A12 constant at 2 and the weighting factor W constant at 0.2.

Referring to FIG. 5B, a series of graphs 550 is shown, in particular a graph 552 showing the Denominator ($e\char`\^x-e\char`\^{-y}$) as bar graph 562, $e\char`\^x$ as bar graph 564, and $e\char`\^{-y}$ as bar graph 566; a graph 554 showing the Acoustic Score A12 (or Input1(x)) as curve 572, Weighted Language Score W(U1+U2) (or Input2) as curve 576, and the CI output value as curve 574; and a graph 556 of the CI output value as curve 582. The series of graphs 550 shows the influence of the $e\char`\^{-y}$ factor in Eq. 1 (bar graph 566) decreasing as the Language Score A12 increases from −9.06 to −1.86, causing the Denominator of Eq. 1 (bar graph 562) to rise and the resulting CI output curve 582 (in graph 556) to decrease.

Referring to table 600 in FIG. 6A, the first row shows the results for the above example for STURRIDGE/ABATED=uncommon/uncommon, and the remaining rows show the results for the Language Score (U1+U2) values that increment by 0.4 for 18 additional data points, from −7.87 to −0.67, which shows the sensitivity of the CI calculation to variations in the Language Score (U1+U2), while holding the Acoustic Score A12 constant at 7 and the weighting factor W constant at 0.2.

Referring to FIG. 6B, a series of graphs 650 is shown, in particular a graph 652 showing the Denominator ($e\char`\^x-e\char`\^{-y}$) as bar graph 662, $e\char`\^x$ as bar graph 664, and $e\char`\^{-y}$ as bar graph 666; a graph 654 showing the Acoustic Score A12 (or Input1(x)) as curve 672, Weighted Language Score W(U1+U2) or Input2 as curve 676, and the CI output value as curve 674; and a graph 656 of the CI output value as curve 682. The series of graphs 650 shows the influence of the $e\char`\^{-y}$ factor in Eq. 1 (bar graph 666), as the Language Score A12 increases from −7.87 to −0.67, having values of 4.8 to 1.1 (column 616, FIG. 6A), which is a very small compared to the $e\char`\^x$ (acoustic score) factor (column 614) having values of about 1,096, causing the Denominator of Eq. 1 (bar graph 662) to stay substantially constant and the resulting CI output curve 682 of graph 656 to remain substantially constant, with only a small change (decreasing) in value, as shown in the exploded graph 656.

Thus, when the Acoustic Score (or Distance) is high, e.g., above 4 or 5, meaning that the words are less phonetically similar, the influence of the language score (U1+U2) on the value of CI is significantly decreased. As shown in the above examples, the confusion index (CI) for common/uncommon in FIGS. 5A and 5B, for STORAGE/STURRIDGE, is much greater than the confusion index (CI) uncommon/uncommon in FIGS. 6A and 6B, for STURRIDGE/ABATED.

Also, while shown as using unigrams (single input words) the confusion index (CI) may be used (or calculated) with multi-word (or n-gram/n-gram or unigram/n-gram) combinations, such as "olaf" vs "all of".

In some embodiments, as shown herein, the Confusion Index CI may be used to decide when to "boost" (or add occurrences of) specific words in the Corpus Data Set for the language model where those words have no context available and need to be boosted artificially for them to be recognized to provide improved automatic speech recognition. Accordingly, the Confusion Index (CI) or Score may help an artificial boost algorithm to work efficiently and diligently so that different confusion cases can be controlled properly. Thus, in some embodiments, the logic of the present disclosure may artificially boost words (with no context) in the language model Corpus Data Set 22 for improved automatic speech recognition.

Also, the Confusion Index may be used while building or adjusting the Lexicon (or dictionary) for a given application or domain space. The Confusion Index CI provides insight into all confusions and the logic of the present disclosure can determine whether to keep or remove words from the lexicon depending upon their importance for a given application or corpus or domain, such as, sports (general sports or specific sports, e.g., football, baseball, soccer, etc.), news (general news or specific type of news, e.g., local vs global), weather (local vs global), technical (e.g., academic/college vs business), or other areas.

The present disclosure adds a weighted "language score" component (e.g., W(U1+U2)) to a word confusion determination that provides a confusion score with a better indication of the degree (or level) of confusion between two words and which results in a better resolution of, or minimizing the impact of, the confusion within an automatic speech recognition (ASR) system 34 (FIG. 1A). Also, the "language score" component has negligible (or reduced) influence on CI when the acoustic score is high (i.e., the words are not phonetically similar or they do not sound alike). As a result, two dissimilar-sounding words will always have low confusion index (CI) and can be easily ignored by comparing the CI value to a confusion threshold (Tc) as discussed herein.

Prior solutions do not take language into account and thus any two words with same pronunciations (and thus the same acoustic scores) were treated equally. The approach of the present disclosure classifies confusions based on the confusion index so that each case can be handled appropriately unlike prior solutions which provides no such intelligence and treats every confusion the same. Thus, the approach of the present disclosure helps in resolving word conflicts better and improves the accuracy of the word conflict resolution.

In some embodiments, as discussed herein, the system of the present disclosure may be used to incorporate (or add or merge) an uncommon or new word data set associated with a specific domain (e.g., sports, news, weather, geography, or the like), such as players names, show/movie characters, locations, etc., into an existing (or generic) corpus data set using the Confusion Index to avoid or reduce confusion. In particular, the Confusion Index of the present disclosure may be used to help merge domain-specific words (e.g., new or uncommon words) effectively when combining them with a generic corpus data set (and corresponding language model) for use by an auto speech recognition (ASR) system. Also, the Confusion Index may be used to add or boost domain-specific words (like sports domain) within the generic data set (or language model) where there is access to the generic data set so that the two data sets (or models) may be merged appropriately and balanced for the improved recognition. The Confusion Index helps in this merger to provide efficient control or adjustments for different confusion cases. Also, the present disclosure allows for fine-tuning the confusion threshold (Tc) and the level of boost for each word that is merged to the new resulting corpus data set (and corresponding language model).

Also, in some embodiments, as discussed herein, the system of the present disclosure may be used to decide and limit the lexicon used in a given speech recognition system, depending on the application. In that case, the confusion index may also be used to help build a lexicon for a given specific application. Also, the confusion index may be used to identify corpus words that are likely to cause confusion, and the system (or a user) can then decide to keep or remove words from the lexicon depending upon their application and the level of potential confusion.

Also, in some embodiments, as discussed herein, the system of the present disclosure may be used to improve recognition results from third-party generic speech-to-text (STT) system, which have generic corpus data sets and corresponding language models with many words that are not relevant in a certain domain; but as they exist in the model they have a good chance of being recognized instead of a domain specific word. For example, "purdue" becomes "produce", "quarter" becomes "quote uber", "deportes" becomes "to portis" or "the potus"). With the system of the present disclosure, the CI can eliminate or reduce the likelihood of many such scenarios for domain-specific (or uncommon) words that are confusing with highly common words by adding more context for those words in their interaction models (or corpus data set) so that third party speech-to-text text (STT) (or ASR) language models can apply appropriate word occurrences or contexts (or the like) on the domain-specific words to improve the accuracy of domain-specific (or uncommon) words recognition.

Also, in some embodiments, the system of the present disclosure may be used to improve recognition for common foreign language words spoken in English. In particular, the present disclosure may improve the recognition of foreign language words which are widely used in English by finding their confusion index with common English words and adjust/boost the word occurrences and add context, as appropriate, to the corpus data set (or language model), to achieve better recognition by the ASR.

The present disclosure may also be used in any application or system to measure the degree of confusion between two words (or two phrases) where both phonetic similarity and likelihood of occurrence (word frequency or n-gram or unigram) are important factors or considerations for evaluating or measuring or adjusting for confusion between two words or two phrases or a word and a phrase (i.e., a plurality of words).

Accordingly, the system and method of the present disclosure provides an improved and balanced approach to adjusting confusion errors early/quickly, which prevents propagating errors that would need to be handled at a much later stage. Also, the system allows the ASR system to be more efficient by not having to resolve confusions in real-time. The system and method can be run (or executed) one time or offline at the time of language model generation, or when the uncommon (or domain-specific) word list is updated. In addition, the system and method of the present disclosure improves recognition and reduces errors by clearing or reducing confusion with common words early. Also, by measuring the level (or degree) of confusion with the Confusion Index, the system is able to use different or tailored techniques to resolve different levels of confusions.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for improving the performance of an automatic speech recognition (ASR) system that uses a language model based on a corpus data set which includes words from a generic corpus data set and a domain-specific data set, using a confusion index indicative of the amount of confusion between words from the data sets, comprising:
    determining the confusion index using a method comprising:
        receiving a first word from the generic corpus data set and a second word from the domain specific data set;
        calculating an acoustic score A12 indicative of an acoustic distance between the first word and the second word using a lexicon having a phonetic breakdown of the first word and the second word;
        calculating a weighted language score indicative of the likelihood of the first word and the second word occurring in the corpus data set, comprising performing an equation: $W(U1+U2)$, where U1 and U2 are unigram values of the first word and the second word, respectively, and W is a weighting factor in the weighted language score;
        calculating the confusion index (CI) using the acoustic score and the weighted language score, comprising performing an equation: $CI=1/(e^{A12}-e^{-W(U1+U1)})$; and
        adjusting the corpus data set based on the value of CI.

2. The method of claim 1, wherein at least one of the first word and the second word comprises a plurality of words and wherein U1 and U2 are n-gram values of the first word and the second word, respectively.

3. A method for improving the performance of an automatic speech recognition (ASR) system that uses a language model based on a corpus data set which includes words from a generic corpus data set and words from a domain-specific data set, using a confusion index indicative of the amount of confusion between words from the generic corpus data set and the domain-specific data set, comprising:
    determining the confusion index using a method comprising:
        receiving a first word from the domain-specific data set and a second word from the generic corpus data set;
        calculating an acoustic score indicative of the acoustic distance between the first word and the second word using a lexicon having a phonetic breakdown of the first word and the second word;
        calculating a weighted language score indicative of the likelihood of the first word and the second word occurring in the corpus data set;
        wherein the weighted language score comprises an equation: $W(U1+U2)$, where U1 and U2 are unigram values of the first word and the second word, respectively, and W is a weighting; and
        calculating the confusion index (CI) using the acoustic score and the weighted language score.

4. The method of claim 3, wherein the calculating the confusion index comprises performing an equation: $CI=1/(e^{A12}-e^{-W(U1+U1)})$, where A12 is the acoustic distance between the first word and the second word.

5. The method of claim 3, wherein the domain-specific data set comprises an uncommon word list.

6. The method of claim 5, wherein the calculating CI is performed for each first word in the uncommon word list against each second word in the generic corpus data set.

7. The method of claim 3, wherein the impact of the language score on CI is greater when the first word and the second word sound alike.

8. The method of claim 3, wherein at least one of the first word and the second word comprises a plurality of words.

9. The method of claim 3, wherein the CI value when the first word and the second word sound alike and have a high likelihood of occurring in the corpus is higher than when the first word and the second word sound alike and do not have a high likelihood of occurring in the corpus.

10. The method of claim 3, further comprising updating at least one of the corpus data set and the lexicon based on the value of CI.

11. The method of claim 3, further comprising boosting domain-specific words in the corpus when CI is greater than a predetermined confusion threshold.

12. The method of claim 3, further comprising adding context to domain-specific words in the corpus when CI is less than a predetermined confusion threshold.

13. The method of claim 3, further comprising removing an unimportant corpus word from the lexicon when CI is less than a predetermined confusion threshold.

14. The method of claim 3, wherein the calculating the weighted language score comprises determining the weighting factor (W).

15. The method of claim 14, wherein the weighting factor (W) is based on the value of at least one of the acoustic score and a language score (U1+U2), where U1 and U2 are n-gram values of the first word and the second word, respectively.

16. The method of claim 3, wherein the acoustic distance between the first word and the second word is determined using a string edit distance measurement tool.

17. A method for improving the performance of an automatic speech recognition (ASR) system that uses a language model based on a corpus data set which includes words from a corpus first data set and a domain-specific second data set, using an amount of confusion between words, comprising:
    calculating a confusion index (CI), comprising:
        receiving a first word from the first data set and a second word from the second data set;
        calculating an acoustic score indicative of the acoustic distance between the first word and the second word using a lexicon having a phonetic breakdown of the first word and the second word;
        calculating a weighted language score indicative of the likelihood of the first word and the second word occurring in the corpus data set;
        wherein the weighted language score comprises an equation: W(U1+U2), where U1 and U2 are unigram values of the first word and the second word, respectively, and W is a weighting factor; and
        calculating the confusion index (CI) using the acoustic score and the weighted language score.

18. The method of claim 17, wherein the calculating the confusion index comprises performing an equation: $CI = 1/(e^{A12} - e^{-W(U1+U1)})$, where A12 is the acoustic distance between the first word and the second word.

* * * * *